United States Patent [19]

Pere

[11] 4,123,877
[45] Nov. 7, 1978

[54] APPARATUS FOR SUPPORTING AND ASSISTED GUIDING OF A MACHINING TOOL

[75] Inventor: Gérard Pere, Le Breuil, France

[73] Assignee: Creusot-Loire, Paris, France

[21] Appl. No.: 841,529

[22] Filed: Oct. 11, 1977

[30] Foreign Application Priority Data

Oct. 29, 1976 [FR] France ............................... 76 32862

[51] Int. Cl.² .......................................... B24B 51/00
[52] U.S. Cl. ...................................... 51/165.9; 51/99; 51/47; 51/166 FB
[58] Field of Search ............ 51/166 FB, 166 R, 34 G, 51/34 C, 34 E, 99, 165.9, 165.92, 47

[56] References Cited

U.S. PATENT DOCUMENTS

| | | | |
|---|---|---|---|
| 2,769,280 | 11/1956 | Comstock ................................ | 51/47 |
| 3,039,236 | 6/1962 | Thiel et al. ........................ | 51/166 R |
| 3,953,943 | 5/1976 | Nakaoka ............................... | 51/34 E |

FOREIGN PATENT DOCUMENTS 2,142,700  7/1977  Fed. Rep. of Germany .............. 51/99

*Primary Examiner*—Nicholas P. Godici
*Assistant Examiner*—Roscoe V. Parker

*Attorney, Agent, or Firm*—Haseltine, Lake, & Waters

[57] ABSTRACT

An apparatus for the support and assisted guiding of a tool for machining a workpiece of large dimensions substantially without effort on the part of the operator, comprises a telescopic supporting arm mounted on a carriage for vertical movement and for angular movement about a horizontal axis, a telescopic secondary arm mounted on the end of the telescopic portion of the supporting arm for angular movement relative thereto about two perpendicular axes perpendicular to the longitudinal axis of the supporting arm, means for supporting and orientating a tool on the telescopic end portion of the secondary arm so that the tool is angularly movable about three orthogonal axes relative to the secondary arm, means for moving the supporting arm relative to the support, the secondary arm relative to the supporting arm and the tool relative to the secondary arm, and a six position manipulator for providing sensitive control of the translatory movements of the secondary arm and non-sensitive control of the means for orientating the tool so that movement of the tool and the application thereto of a machining force can be achieved by application of a relatively low force to the manipulator by an operator.

4 Claims, 6 Drawing Figures

APPARATUS FOR SUPPORTING AND ASSISTED GUIDING OF A MACHINING TOOL

The invention relates to an apparatus for the support and assisted guiding of a tool for machining a workpiece of large dimensions substantially without effort on the part of the operator.

Finishing treatments on workpieces of very great dimensions, such as cast hydraulic turbine wheels, comprise manual operations such as grinding which, in view of the large surface of the workpieces that are to be ground and their complicated shapes, are extremely lengthy and arduous for the personnel who have to carry out this work.

Therefore, this work is in very many cases carried out to the detriment of the quality and the final production cost of the machined workpieces. The work would be of much better quality if it were carried out under less arduous conditions for the operator.

Furthermore, it is not possible, in the case of workpieces of large dimensions and complex shape, to use entirely automatic machines for carrying out these grinding operations, and it is necessary for human control always to be maintained during the movements and operation of the tool.

In addition, an apparatus for the assisted guiding of the tool during its movements and operation can only be of some interest if it can be used without the need for a setting time of any great length. It is therefore necessary that the control movements of the tool be as close as possible to the movements necessary for guiding the tool without the use of an assisted control system. It is also necessary that this control be sensitive so as to enable the grinding pressure to be varied, for example for the purpose of removing flaws from the surface of the workpiece.

Moreover, it is necessary that the operator should be able to guide the tool while in very close proximity to the portion of the workpiece that is being machined.

Finally, it is also necessary to be able to impart to the tool displacement movements of large amplitude without effort and along one path in any given position of the tool.

It is an object of the invention to provide an apparatus for the support and the assisted guiding of a manually operated tool for machining workpieces of large dimensions substantially without effort on the part of the operator, which apparatus can be used in a very simple manner and operated very reliably.

It is a further object of the invention to provide apparatus for the support and assisted guiding of a tool for machining a workpiece of large dimensions substantially without effort on the part of the operator, the apparatus comprising:

a carriage movable over the floor of the workshop;

a vertical column fast with said carriage;

a support rotatable about the vertical axis of said column and carrying a horizontal pivot;

a telescopic supporting arm mounted on said support by said horizontal pivot;

means for rotating said support about said vertical axis and for effecting translatory displacement of the telescopic portion of said supporting arm a secondary telescopic arm;

means mounting said secondary arm on an end portion of said telescopic portion of said supporting arm comprising a first and a second rotational displacement device, each said device comprising a first relatively fixed portion and a second portion rotatable relative thereto, said fixed portion of said first device being secured to said supporting arm, said fixed portion of said second device being secured to said rotatable portion of said first device, said rotatable portion of said second device being secured to an end portion of said secondary arm, the axis of rotation of said rotatable portion of said first device being perpendicular to the longitudinal axis of said supporting arm and the axis of rotation of said rotatable portion of said second device being perpendicular to said axis of rotation of said rotatable portion of said first device;

means for effecting translatory displacement of said telescopic portion of said secondary arm for enabling, by said translatory displacement means and said rotational displacement devices, force to be applied to a tool when mounted on the end of said secondary arm;

means for supporting and orientating a tool and secured to the end portion of the telescopic portion of said secondary arm, said means comprising first, second and third rotational displacement devices, each said device comprising a relatively fixed portion and a portion rotatable relative thereto, said fixed portion of said first device being secured to said secondary arm, said fixed portion of said second device being secured to said rotatable portion of said first device, said fixed portion of said third device being secured to said rotatable portion of said second device, said rotatable portion of said third device being adapted to be secured to a tool, the axis of rotation of said rotatable portion of said first device being perpendicular to the longitudinal axis of said secondary arm and to the axes of rotation of said rotatable portions of said other devices;

means for controlling rotation of said support and telescopic movement of said supporting arm; and a six-position manipulator secured to said secondary arm for sensitive control of said means for effecting translatory displacement of said telescopic portion of said secondary arm and for non-sensitive control of said means for orientating the tool, movement of the tool and the application of a machining force thereto being achieved by application of a relatively low force to said manipulator and by control of said supporting arm.

It is another object of the invention to provide a manipulator for such apparatus comprising:

a cylindrical pedestal having a vertical axis;

first and second displacement sensors secured to said pedestal, said first sensor being adapted to detect vertical movements and said second sensor being adapted to detect horizontal movements;

a first actuating device arranged partially within said pedestal and mounted for vertical sliding movement against springs bearing on said pedestal, said first actuating device being rotatable about the vertical axis of said pedestal and being arranged relative to said first and second sensors such that vertical movements of said first actuating device will be detected by said first sensor, and rotational movements of said first actuating device, which result in a horizontal displacement because of the asymmetrical shape of the actuator in relation to the vertical axis, will be detected by said second sensor;

a second partially hollow actuating device having a horizontal actuating surface;

a universal joint connecting the lower portion of said second actuating device to the upper portion of said first actuating device, said universal joint having axes which are horizontal and perpendicular to each other, and permitting rocking movements of said second actuating device about the axes of said universal joint and against the action of opposing springs carried by said first actuating device;

third and fourth displacement sensors for detecting horizontal movements and mounted in said second actuating device;

fifth and sixth displacement sensors carried by a support connected for vertical translatory movement to said first actuating device and being held against rotation relative to said pedestal and for detecting rocking movements of said actuating surface of said second actuating device;

a handle for operating said manipulator;

a universal joint connecting the upper portion of said second actuating device to said handle and having axes which are horizontal and perpendicular to each other; and a third vertical actuating device disposed within said second actuating device and articulated at its upper end to the lower end of said handle and below said universal joint of said handle and articulated to the lower end of said second actuating device by its lower end, said third actuating device having a lower portion located adjacent said third and fourth sensors for actuating said third and fourth sensors when said handle is rotated about said axes of said universal joint arranged between said handle and said second actuating device; wherein said six displacement devices are controllable independently of each other either by movement of said handle in relation to said manipulator or by displacement of said entire manipulator.

An embodiment of apparatus in accordance with the invention and used with a grinding tool for carrying out finishing work on cast turbine wheels will now be described, by way of example only, with reference to the accompanying drawings.

Figure 1:
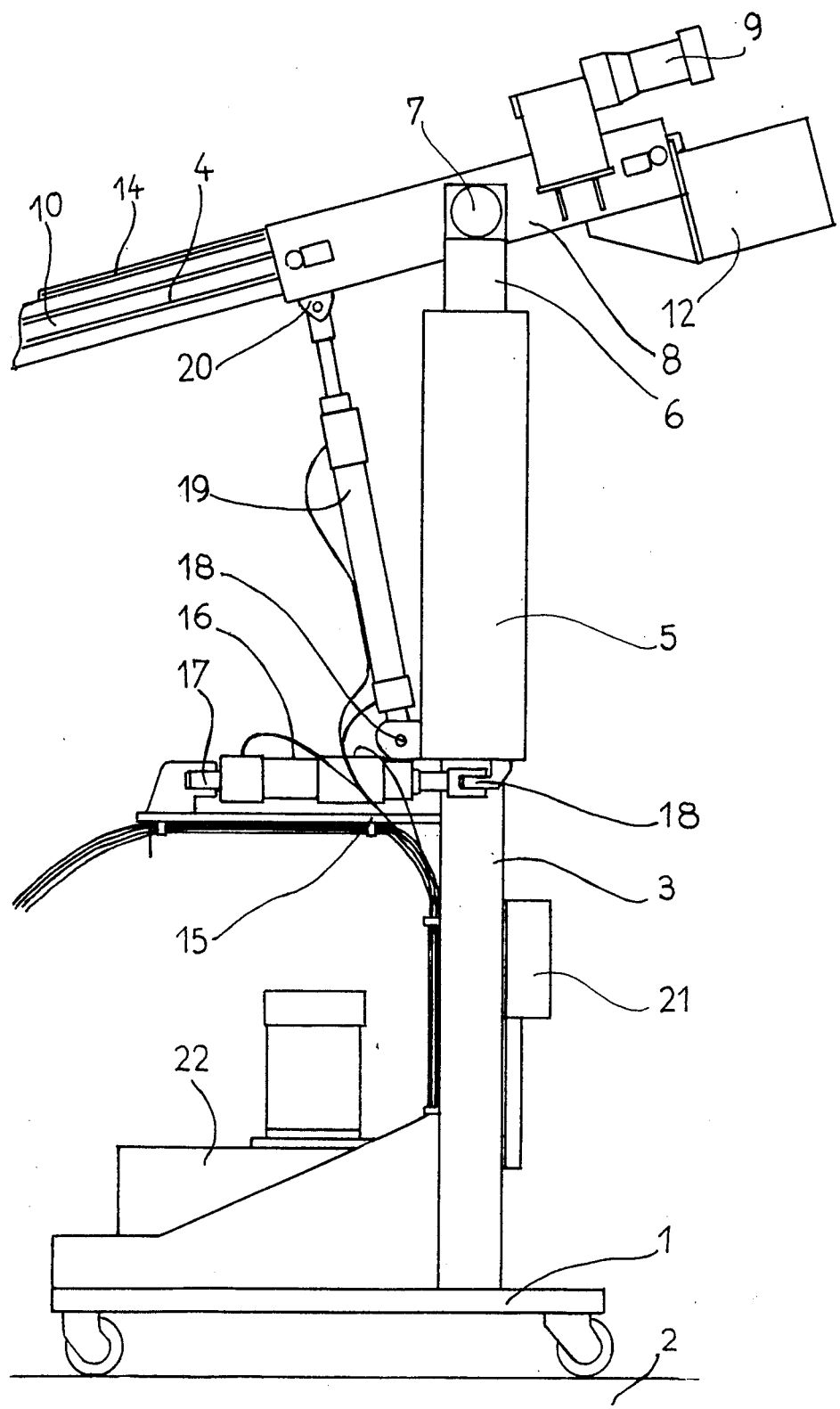
FIG. 1 is a side elevation of part of an embodiment of a supporting and assisted guiding apparatus in accordance with the invention, and showing the carriage of the apparatus and its supporting arm.

The apparatus shown in part in FIG. 1 comprises a carriage 1 having wheels which are movable over the floor 2 of the workshop. Solidly secured to the carriage 1 is a vertical cylindrical column 3. Fitted over the top of the column 3 is a cylindrical sleeve 5 of suitable inside diameter such as to ensure clearance-free rotation about the vertical axis of the column 3 of a support 6 connected to the upper portion of the sleeve 5. The support 6 carries a horizontal pivot 7 on which is pivoted the non-telescopic portion 8 of a supporting arm 4. The supporting arm 4 comprises, in addition to the relatively fixed portion connected to the horizontal pivot 7, a telescopic portion 10 adapted to execute a translatory movement along the longitudinal axis of the supporting arm within portion 8 of this arm. At its end remote from the telescopic portion 10, the portion 8 of the arm carries a counterweight 12 adapted to offset the weight of the telescopic portion 10 of the arm.

The portion 8 also carries a motor and reducing gear unit 9, the output pinion of which engages a rack 14 carried by the telescopic portion 10 of the supporting arm 4. Rotation of the motor in one or other direction imparts translatory movement to the telescopic portion 10 of the arm in one or other direction. The column 3 also carries a support 15 to which is secured a hydraulic jack 16, the cylinder of which is articulated at 17 to the support 15, and the piston rod of which is articulated at 18 to the base of the sleeve 5 rotating the support 6 for the horizontal pivot 7 about which the supporting arm is pivoted.

The sleeve 5 also carries a support 18a to which is articulated the cylinder of a jack 19, the piston rod of which is articulated at 20 to the nontelescopic portion 8 of the supporting arm 4.

The column 3 also carries a box 21 in which are located all the electrical elements necessary for controlling the apparatus and for protecting it in various ways. The carriage 1 carries a motor and pump unit 22 supplying pressurized fluid to the various jacks for controlling the apparatus.

Figure 2:
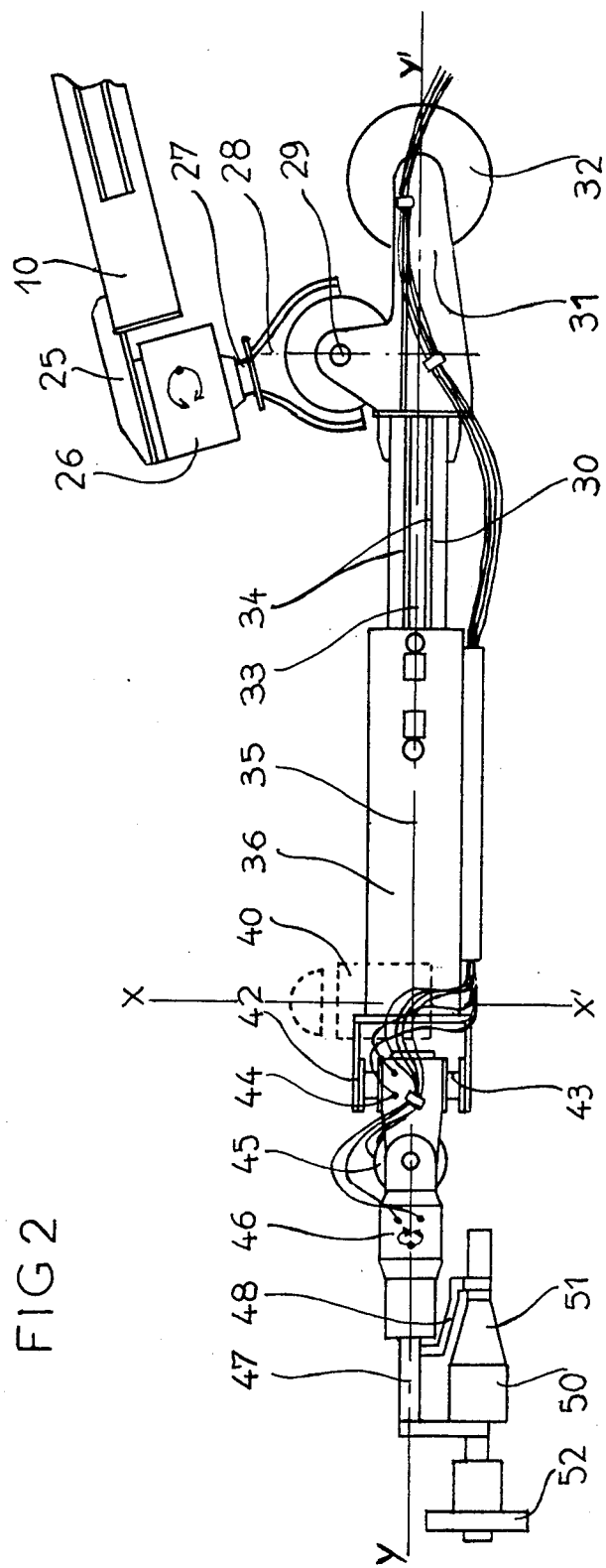
FIG. 2 illustrates, also in side elevation, the end of the supporting arm shown in FIG. 1 as well as the secondary arm connected thereto and the device for orienting the grinding tool secured to the secondary arm.

FIG. 2 shows the end of the telescopic portion 10 of the supporting arm, to which end is rigidly secured a support 25 carrying the cylinder of a rotary jack 26. The shaft 27 of this rotary jack 26 is solidly connected to the cylinder of a rotary jack 28, the shaft 29 of which is rigidly connected to the end of a secondary arm 30. The axis of rotation of the shaft 27 of the rotary jack 26 is perpendicular to the longitudinal axis of the supporting arm 4. The axis of rotation of the shaft 29 of the rotary jack 28 is perpendicular to the axis of rotation of the shaft 27. The secondary arm 30 comprises a nontelescopic portion 31 and a telescopic portion 35. The non-telescopic portion comprises a cheek-plate for connection to the shaft 29 of the jack 28, an end portion on which a counterweight 32 is mounted, and a tube 33 comprising longitudinal guide elements 34. The telescopic portion 35 comprising complementary guide elements is fitted over the tube 33 and encloses a linear jack 36 which is not visible in the drawing, the cylinder of which is articulated to the non-telescopic portion 33 of the secondary arm, while its piston is articulated to the telescopic portion 35 of the secondary arm. This linear jack enables the secondary arm to be extended and retracted.

The telescopic portion 35 of the secondary arm 30 also carries a manipulator 40 which is shown diagrammatically in broken lines in FIG. 2. This manipulator is shown in detail in FIGS. 3 to 6. The end of the telescopic portion 35 of the secondary arm also carries a support 42 on which is secured the shaft 43 of a rotary jack 44, the cylinder of which is connected to the body of a rotary jack 45. The piston of the rotary jack 45 is connected to the cylinder of a rotary jack 46, the shaft 47 of which carries a support 48 for a grinding tool 50. The grinding tool incorporates a driving motor 51 and a grinding disc 52.

The shaft 43 of the rotary jack 44 is rigidly secured to the support 42 fast with the end of the secondary arm 30 so that its axis is perpendicular to the longitudinal axis of the secondary arm. In this way the cylinder of the jack 44 is movable about this axis perpendicular to the longitudinal axis of the secondary arm. The axis of rotation of the rotary jack 45, the shaft of which is connected to the jack 46, is perpendicular to the axis of rotation of the jack 44. In this way the jack 45 is rotated about this axis perpendicular to the axis of rotation of the jack 44. Finally, the axis of rotation of the jack 46, the shaft 47 of which supports the grinding tool by way of its support 48, is itself perpendicular to the axis of rotation of the jack 45.

The manipulator 40, illustrated diagrammatically in FIG. 2, will now be described in detail by reference to FIGS. 3 to 6 which are sectional views showing the various elements of this manipulator.

The manipulator 40 comprises a pedestal 60 whereby it can be secured to the secondary arm. This pedestal 60 comprises a smooth vertical portion 64, the axis XX' of which is vertical and on which is fitted a second portion 61 of the manipulator, which portion is fitted in a bore 65 formed in a further portion of the pedestal 60, easy friction fits existing between these various parts. The portion 61 can therefore be moved in translation relative the pedestal 60 in the vertical direction, and is also rotatable about the vertical axis XX' of the manipulator. As can be seen from FIGS. 3 and 4, the portion 61 which is of generally cylindrical shape does not have the shape of a body of revolution at its base which constitutes a cam for actuating the rod of a displacement sensor 70 when the portion 61 rotates about the axis XX'. The portion 61 is in turn connected at its upper end by way of a universal joint 66 to an actuator 62 connected at its upper end by a universal joint 67 to a hemispherical handle 63 of the manipulator. The handle 63 is also connected, below the universal joint 67, to a ball-and-socket joint actuator 68 comprising an upper ball-and-socket joint 69 and a lower ball-and-socket joint 71. The ball-and-socket joint 69 is mounted in a seat provided at the base of the handle 63 in that portion thereof located below the universal joint 67. The ball-and-socket joint 71 is mounted in a seat provided on a base plate 72 located at the lower end of the actuator 62.

The manipulator comprises, in addition to the pedestal 60 and the actuating elements 61, 62 and 63, a set of six displacement sensors of the same type as the sensor 70 and each corresponding to a movement which may have to be controlled by the manipulator which is fast with the secondary arm of the device for the assisted control of the tool. Thus, one displacement sensor 75 is disposed vertically in relation to the base of the manipulator in a central position in a cylindrical opening formed in the central cylindrical portion of the pedestal 60. To enable this displacement sensor to be actuated, its rod is disposed adjacent the lower surface of the tubular actuating part 61 and mounted to slide within the pedestal 60.

Two other sensors 76 and 77 are likewise arranged vertically below the base plate 72 of the actuator 62. These sensors 76 and 77 are secured against rotation during the rotary movements of the actuator 61 about the axis XX'. The sensors 76 and 77 are carried by a support 78 connected for movement with the actuator 61 in its translatory movements in vertical direction by means of a ring 81 fitted around the part 61, the support 78 being fitted between the ring 81 and a collar 79 formed on the part 61. The support 78 is secured against rotation during rotational movement of the support 61 about the axis XX' by threaded rods 80 which are secured to the pedestal 60 and extend through openings in the support 78, the openings having a diameter greater than the diameter of the rods 80. Since the support 78 has an easy frictional fit around the outer surface of the actuator 61, rotational movement of this actuator 61 still remains possible. Arranged around the rods 80 are springs which apply bias upwardly and downwardly of the support 78 and of the part 61.

The last two sensors 82 and 83 are arranged horizontally within the actuator 62, their axes being at an angle of 90° to each other. The rods of the sensors 82 and 83 are arranged close to the lower cylindrical portion of the actuating part 62 provided with a ball-and-socket joint.

The manipulator enables each of the displacement sensors to be actuated independently of the other sensors.

Figure 3:
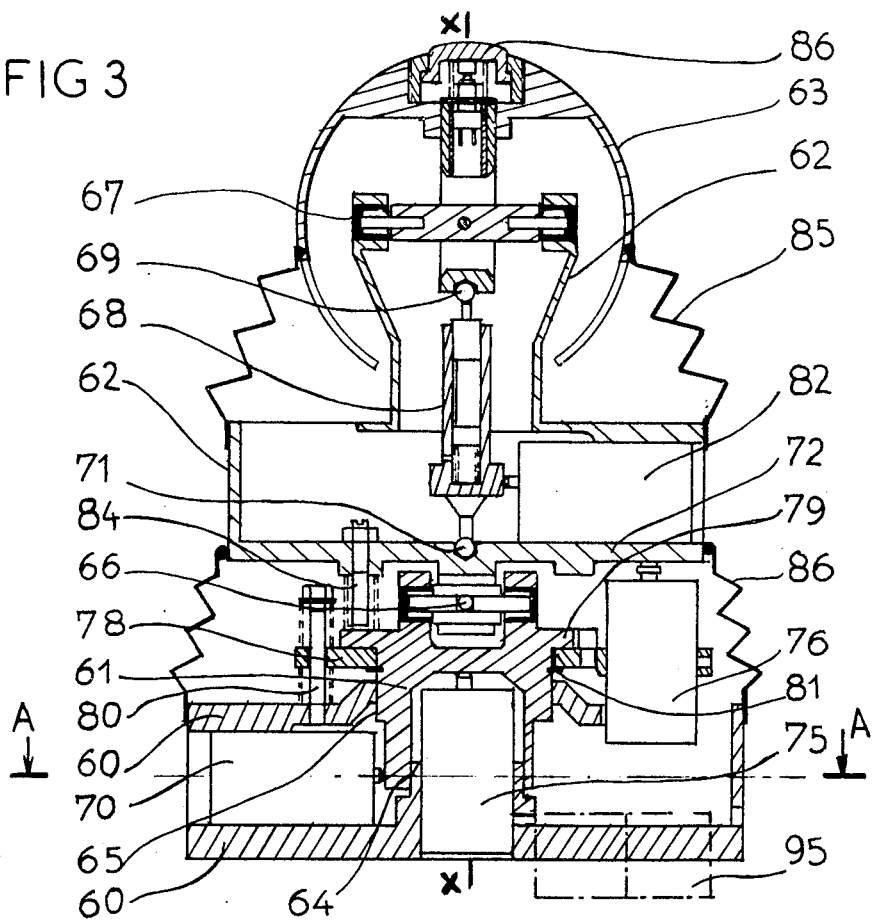
FIG. 3 illustrates, along a vertical plane of symmetry, a section through the six-position manipulator provided on the secondary arm for controlling displacement of the grinding tool.

The manipulator also comprises four springs for biasing the actuator 62, one of these springs being shown at 84 in FIG. 3. Finally, to prevent the ingress of dust or foreign bodies into the delicate mechanisms of the manipulator, deformable walls 85 and 86 of the bellows type close off the side walls of the manipulator between the actuating handle 63 and the part 62, and between the part 62 and the pedestal 60.

It will be seen from the description of the mode of operation of the manipulator for controlling the various movements of the assisted control apparatus for the manually-operated tool that not only can the six main movements controlled by the manipulator be independent of each other, but also that these movements of the manipulator enable the tool to execute movements corresponding to the displacements of the manipulator or of its handle.

Figure 4:
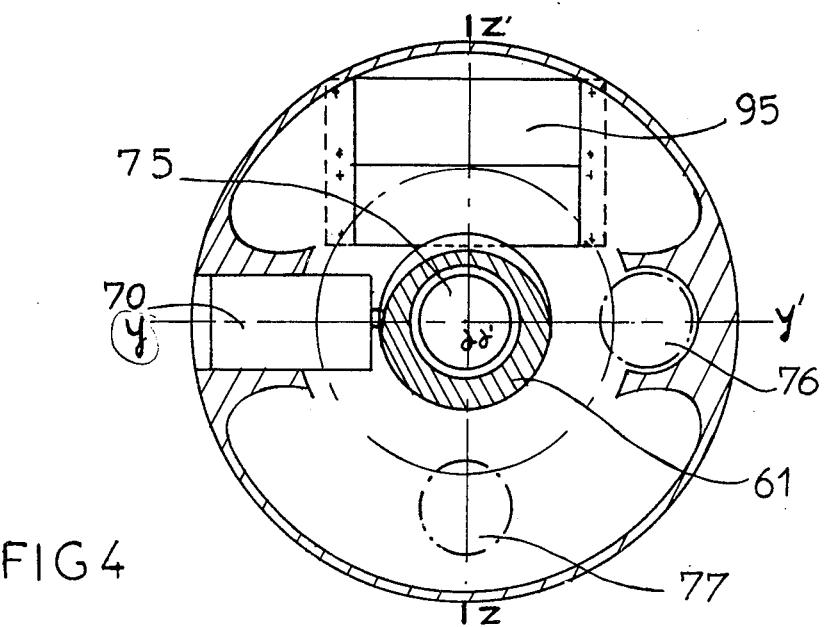
FIG. 4 is a section along the line A—A of FIG. 3.
Figure 5:
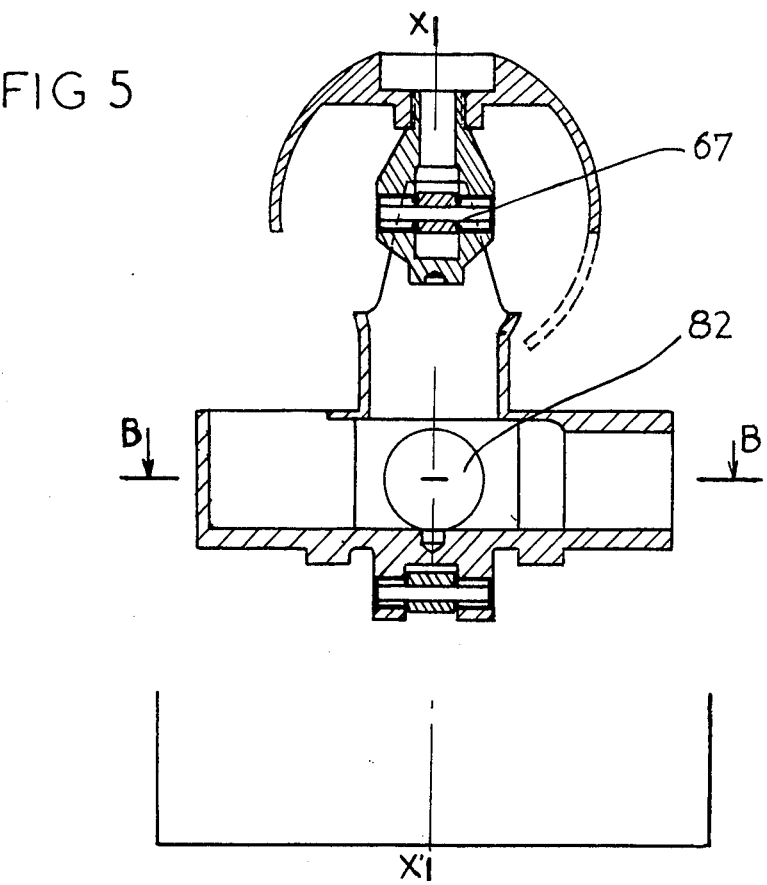
FIG. 5 is a sectional view of the upper portion of the manipulator along the vertical plane perpendicular to the plane of the section in FIG. 3.
Figure 6:
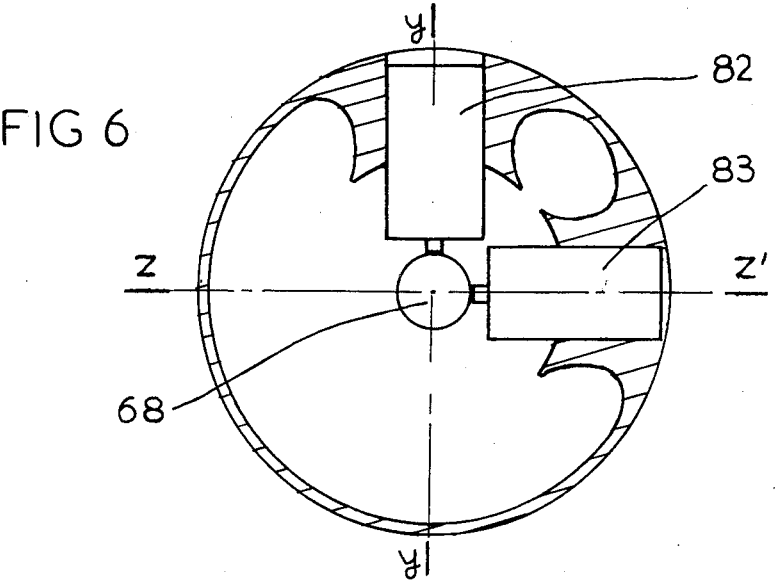
FIG. 6 is a sectional view along the line B—B of FIG. 5.

As illustrated in FIG. 3, the manipulator 40 is shown in section in a vertical plane passing through the axis of the secondary arm and designated by the letters YY' (FIG. 4). Also defined is an axis ZZ' for completing the trihedron XX', YY', ZZ' having three right angles. This axis ZZ' is perpendicular to the plane of FIGS. 2 and 3.

For controlling the jacks, each of the displacement sensors is associated with one of the jacks for controlling the secondary arm or with one of the jacks for controlling the device for orienting the tool.

Thus, the displacement sensor 70 is associated with the rotary jack 44, the displacement sensor 75 with the rotary jack 28; the displacement sensor 76 is associated with the linear jack arranged within the telescopic portion 35 of the secondary arm 30, the sensor 77 with the rotary jack 26, the sensor 82 with the rotary jack 45, and finally the displacement sensor 83 with the rotary jack 46.

A case 95 is fitted in the base-plate of the pedestal 60 for the electrical connection of the various sensors, for supplying these sensors with current and for transmitting the value relating to the displacements of the components of the manipulator.

The movements of the supporting arm that are caused by the linear jacks 16 and 19 are electrically controlled from a switch box carried by the operator and by way of current distributors which permit uniform displacement of these jacks when the corresponding switch is actuated. The same control box also incorporates a constant-speed control means for the movement of the supporting arm 4 in each direction by means of the system comprising the motor and reducing gear unit and the rack, the advance or return of which is continued as long as the switch is engaged.

The mode of operation of the above described apparatus during a grinding operation will now be described.

The carriage 1 is moved close to the large workpiece that is to be ground, for example a turbine wheel, and the operator, by means of the electrical control box, imparts movements of large amplitude caused by the jacks 16 and 19 and by the motor and reducing gear unit and the rack, this box being held in the left hand and the tool being brought into a first position in the zone where the grinding operation is to be carried out. Combination of the various movements obtained by means of the three displacement units mentioned above simply permits the carrying out of any movement aimed at positioning the tool near the zone to be ground. To achieve these approach movements it is not necessary to cause the arm to rotate over large distances around the vertical axis and around the horizontal axis; in practice all that is required is a rotation through 30° in each direction from the middle position of the arm. In the case of a turbine wheel of normal size, it is only necessary that the rack should have a stroke in the order of two meters and that the means for the horizontal pivoting of the arm should be at a level in the order to 2.50 meters. Furthermore, the electrical control box held in the left hand by the operator incorporates a safety device which has to be operated to enable movements of large amplitude to take place. Thus these movements cannot take place unless the operator requires them. In this way the tool is brought into the operating position without effort on the part of the operator. At the top of the handle 63 is a device 86 which has to be engaged to enable the jacks controlled from the manipulator, i.e. the jacks controlling the movements of the secondary arm and of the device for orienting the tool, to be supplied from the pressurized fluid source. This device 86 cannot remain engaged when the operator has released the handle 63 since springs lift the device 86 which prevents the jacks from receiving and releasing pressurized fluid. The jacks are then locked in position. A further condition for the supply of the jacks controlling the secondary arm and the device for orienting the tool is constituted by an additional contact unit provided on the electrical control box held in the left hand of the operator, which unit comprises six pulsing contacts for the movements of the supporting arm (two displaceable contacts for the displacements in each direction) and two safety contacts which prevent movements of the control apparatus that are not required by the operator. One of the safety contacts is connected in series with the contact connected to the device 86.

When the operator has completed the approach movement of the tool, he retains the box in his left hand to enable the safety device for supplying the jacks to be engaged. With his right hand the operator then directs the tool towards that place on the workpiece that is to be ground, these displacements and the support of the tool during these movements being achieved without effort since they are dealt with entirely by the various jacks associated with the secondary arm and with the device for orienting the tool.

As regards the movements of the displacement of the secondary arm itself, this displacement has three components permitting movements in all directions in space. The operator may, on the one hand, push on the manipulator in the direction of the axis YY' in one sense or the other, and at this moment this movement does not cause any displacement at the universal joint 67. On the other hand it causes slight rocking of the actuator 62 either forwardly or rearwardly, this actuator 62 rocking about the axis of the universal joint 62 extending in the direction ZZ'. Rotation of the actuating part 62 about the axis ZZ' causes a displacement to be picked up by the rod of the displacement sensor 76. In the case of a displacement of the secondary arm by rotation of such kind that the operator moves the secondary arm away or brings it nearer in the lateral direction, i.e. in the direction of the axis ZZ', in the same manner as before, no movement will take place at the universal joint 67; in this case too, the part 62 will rock but this time rocking will take place about the axis YY' of the universal joint 66, and the plate 72 will actuate the displacement sensor 77.

In the case where the operator desires to raise or lower the secondary arm to bring the tool to the required height or to apply it to the workpiece that is to be ground, these total movements of the manipulator will result in a total movement of the handle 63, of the part 62 which is connected to the handle by the universal joint 67, and of the part 61 connected to the part 62 by the universal joint 66, and the inertia of the secondary arm during the upward and downward movements will cause displacement in the vertical direction XX' of the part 61 relative to the pedestal 60 connected to the secondary arm so that the displacement sensor 75 will be actuated.

It will be seen that during all of these main movements, only the sensors associated with the jacks necessary for achieving the required displacements are actuated.

If the operator now requires to orient the tool 50 by imparting suitable movements to the handle 63, he only requires to impart to the handle those movements that would be necessary for displacing the directly held tool, but it will be possible to make these movements without an effort on the part of the operator since the rotary jacks 44, 45 and 46 will make these displacements. When the operator turns the handle 63 about the axis XX', a movement whereby all of the parts 63, 63 and 61 are rotated relative the pedestal 60 is produced. The base of the part 61 then performs its cam function in relation to the displacement sensor 70 which picks up a linear displacement proportional to the rotary displacement of the handle 63.

If the operator then wishes to rotate the tool about an axis such as ZZ', he causes the handle to rotate about the axis ZZ' of the universal joint 67, and this causes rocking of the base of the handle which in turn causes displacement of the ball-and-socket joint 69, which is mounted in the base of this handle, and rocking of the part 68 which causes the sensor 82, fitted close to the base of the part 68, to pick up a displacement.

If, finally, the operator wishes to rotate the tool about an axis such as YY', he turns the handle about the axis YY' of the universal joint 67, and this causes rocking of the base of the part 68 so as to cause the sensor 83 to pick up a displacement.

Each of the displacements of the secondary arm, caused by total displacement of the manipulator held by the operator, then causes one of the three displacement sensors, that are associated with the piston-and-cylinder units for controlling the secondary arm, to pick up a displacement. The displacement of the corresponding actuators in the manipulator takes place against the action of a set of springs which hold these parts of the manipulator in position. The displacement picked up in the manipulator is thus a function of the force applied by the operator to the manipulator. The displacement sensors associated with the jacks for displacing the secondary arm therefore deliver voltage signals proportional to the force applied to the operating handle 63. These signals are transmitted to pressure-controlled servo-valves which enable the three jacks for controlling the secondary arm to be acted upon by a variable pressure.

This is particularly important when the tool is applied to the workpiece to be ground and when it is necessary to apply heavy variable pressure on the grinding tool to remove flaws in the form of protuberances on the surface of the workpiece. Then, the operator has only to vary the force, still very limited of course, that he applies to the control handle of the manipulator to cause the system controlled thereby to apply the grinding tool to the workpiece with a variable pressure that is much greater than the pressures that the operator could apply directly by muscular effort. The above described manipulator thus provides a sensitive control in a very simple manner.

On the other hand, when the operator actuates the operating handle 63 to vary the orientation of the tool, the displacements picked up by the displacement sensors are only a function of the degree of displacement imparted to the handle so that these displacement sensors deliver a current having a voltage that is proportional only to the rotations of the handle. Rotation of each of the jacks 44, 45 and 46 should be proportional to the rotation applied to the handle and therefore to the voltage delivered by the displacement sensors, this taking place by way of three rotary-displacement sensors mounted on each jack, and three regulating and amplifying devices designed to control the hydraulic servo-valves which vary the supply of oil to the jacks.

The control of the orientation of the tool is therefore not sensitive and it plays no part in the application of pressure by the grinding tool to the workpiece that is to be ground.

The advantages of the above claimed apparatus will be clearly seen from the above description. For example, the approach movements of the tool as well as the movements aimed at bringing it to the required place on the workpiece are achieved without muscular effort on the part of the operator and are provided by natural movements which approximate to those that the operator would carry out during entirely manual work. Sensitive control of the means for applying machining pressure is achieved in an extremely simple manner. Multiple safety devices prevent incorrect manoeuvres and avoid all danger when the apparatus is being used by an operator. The operator directs all of the movements of the tool unit while positioned very close to the workpiece during grinding, and this enables him to carry out a direct visual control as in the case of manual grinding. Finally, most of the sources of energy for supplying the various means for displacing the arms and the tool are carried on the carriage itself. All that is required in addition to these sources of energy mounted on the carriage 1 is an electrical connection for supplying the tool, the control means for which can be provided on the manipulator, and for supplying the displacement sensors and the motor and reducing gear unit used for the approach movements.

A number of flexible hoses enables hydraulic fluid to be supplied to the various jacks from the motor and pump assembly 22 mounted on the carriage 1.

All the sensitive electrical and electronic parts of the equipment are enclosed in the cabinet 21 which can be protected in any suitable manner for resisting attack by the atmosphere such as exists in the workshops in which finishing operations are carried out on large moulded workpieces.

It will be appreciated that the invention is not intended to be limited to the embodiment that has been described, but that it covers all variants thereof, and that details may be modified without thereby departing from the scope of the invention. Thus, it is possible to imagine a manipulator of a different kind from that that has been described, and it is possible to imagine means for imparting rotational and translatory movements to the arms and the tool that differ from the jacks and from the system comprising a motor, reducing gear and rack, that have been described.

Finally it is possible to use the above described supporting and assisted control arrangements for finish-machining operations other than grinding, for example the removal of cracks from metal products, or any other work requiring considerable muscular effort and occupying very long periods because of the size of the workpieces or the difficulty of the operations to be carried out.

What is claimed is:

1. Apparatus for the support and assisted guiding of a tool for machining a workpiece of large dimensions substantially without effort on the part of the operator, the apparatus comprising:
   a carriage movable over the floor of the workshop;
   a vertical column fast with said carriage;
   a support rotatable about the vertical axis of said column and carrying a horizontal pivot;
   a telescopic supporting arm mounted on said support by said horizontal pivot;
   means for rotating said support about said vertical axis and for effecting translatory displacement of the telescopic portion of said supporting arm;
   a secondary telescopic arm;
   means mounting said secondary arm on an end portion of said telescopic portion of said supporting arm comprising a first and a second rotational displacement device, each said device comprising a first relatively fixed portion and a second portion rotatable relative thereto, said fixed portion of said first device being secured to said supporting arm, said fixed portion of said second device being secured to said rotatable portion of said first device, said rotatable portion of said second device being secured to an end portion of said secondary arm, the axis of rotation of said rotatable portion of said first device being perpendicular to the longitudinal axis of said supporting arm and the axis of rotation of said rotatable portion of said second device being perpendicular to said axis of rotation of said rotatable portion of said first device;
   means for effecting translatory displacement of said telescopic portion of said secondary arm for enabling, by said translatory displacement means and said rotational displacement devices, force to be applied to a tool when mounted on the end of said secondary arm;
   means for supporting and orientating a tool and secured to the end portion of the telescopic portion of said secondary arm, said means comprising first, second and third rotational displacement devices, each said device comprising a relatively fixed portion and a portion rotatable relative thereto, said fixed portion of said first device being secured to said secondary arm, said fixed portion of second device being secured to said rotatable portion of said first device, said fixed portion of said third device being secured to said rotatable portion of said second device, said rotatable portion of said third device being adapted to be secured to a tool, the axis of rotation of said rotatable portion of said first device being perpendicular to the longitudinal axis of said secondary arm and to the axes of rotation of said rotatable portions of said other devices;

means for controlling rotation of said support and telescopic movement of said supporting arm; and a six-position manipulator secured to said secondary arm for sensitive control of said means for effecting translatory displacement of said telescopic portion of said secondary arm and for non-sensitive control of said means for orientating the tool, movement of the tool and the application of a machining force thereto being achieved by application of a relatively low force to said manipulator and by control of said supporting arm.

2. A six-position manipulator for a supporting and assisted guiding apparatus as claimed in claim 1, comprising:

a cylindrical pedestal having a vertical axis;

first and second displacement sensors secured to said pedestal, said first sensor being adapted to detect vertical movements and said second sensor being adapted to detect horizontal movements;

a first actuating device arranged partially within said pedestal and mounted for vertical sliding movement against springs bearing on said pedestal, said first actuating device being rotatable about the vertical axis of said pedestal and being arranged relative to said first and second sensors such that vertical movements of said first actuating device will be detected by said first sensor, and rotational movements of said first actuating device, which result in a horizontal displacement because of the asymmetrical shape of the actuator in relation to the vertical axis, will be detected by said second a second partially hollow actuating device having a horizontal actuating surface;

a universal joint connecting the lower portion of said second actuating device to the upper portion of said first actuating device, said universal joint having axes which are horizontal and perpendicular to each other, and permitting rocking movements of said second actuating device about the axes of said universal joint and against the action of opposing springs carried by said first actuating device;

third and fourth displacement sensors for detecting horizontal movements and mounted in said second actuating device;

fifth and sixth displacement sensors carried by a support connected for vertical translatory movement to said first actuating device and being held against rotation relative to said pedestal and for detecting rocking movements of said actuating surface of said second actuating device;

a handle for operating said manipulator;

a universal joint connecting the upper portion of said second actuating device to said handle and having axes which are horizontal and perpendicular to each other; and a third vertical actuating device disposed within said second actuating device and articulated at its upper end to the lower end of said handle and below said universal joint of said handle and articulated to the lower end of said second actuating device by its lower end, said third actuating device having a lower portion located adjacent said third and fourth sensors for actuating said third and fourth sensors when said handle is rotated about said axes of said universal joint arranged between said handle and said second actuating device; wherein said six displacement devices are controllable independently of each other either by movement of said handle in relation to said manipulator or by displacement of said entire manipulator.

3. Apparatus according to claim 1, wherein said means for controlling said supporting arm comprises a safety device comprising a contactor to be actuated by the operator and held in the working position to permit operation of said means for displacing said supporting arm.

4. Apparatus according to claim 1, wherein said manipulator comprises a contactor to be actuated and held in the working position by the operator for permitting operation of said means for displacing said secondary arm and for orienting the tool, said contactor being connected in series with a contactor of the same type carried by a box for said control means for said supporting arm, the arrangement being such that said two contactors must be maintained simultaneously in their said working positions for permitting displacement and guiding of the tool.

* * * * *